UNITED STATES PATENT OFFICE.

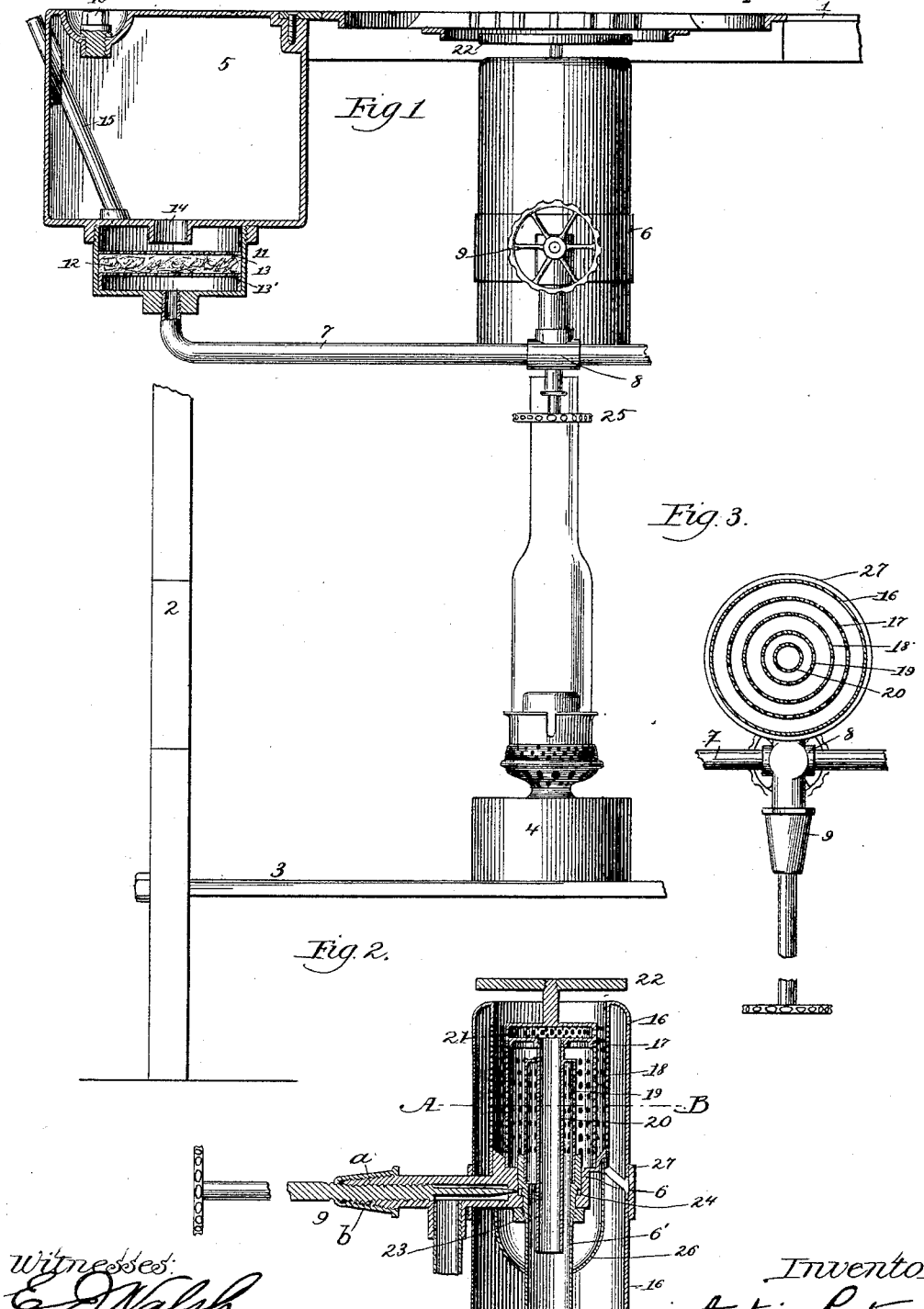

ANTOINE GATEAU, OF CHICAGO, ILLINOIS.

VAPOR-STOVE.

SPECIFICATION forming part of Letters Patent No. 435,693, dated September 2, 1890.

Application filed September 29, 1888. Serial No. 286,734. (No model.)

*To all whom it may concern:*

Be it known that I, ANTOINE GATEAU, of Chicago, State of Illinois, have invented certain new and useful Improvements in Vapor-Stoves; and I do hereby declare that the following is a full, clear, and exact description thereof, reference being had to the accompanying drawings, and to the numbers and letters of reference marked thereon, which form a part of this specification.

This invention relates to improvements in that class of vapor-stove burners in which three perforated tubes are inclosed in such a manner as to form an air-current inside the burner; and it consists of a central tube which carries a supply of fresh air to the burning gas in order to obtain a better combustion; also, of a stop-valve placed near the part of the burner where the oil is converted into gas to cut off the supply of oil in order to prevent the formation of any smoke when the burner is lighted or extinguished, and also of a reservoir placed even with the top plate of the stove, which reservoir has a supply of oil at a constant level with the burner.

In the accompanying drawings, Figure 1 is a side elevation of a part of a vapor-stove containing my improvements, in which the reservoir is represented in section. Fig. 2 is a vertical section of the burner. Fig. 3 is a plan view through line A B of the same.

In Fig. 1, 1 is the top plate of the stove, supported by two legs 2, one of which is not shown in the drawings and the other of which is broken at the top in order to show the entire section of the reservoir 5.

3 is a shelf shown in part secured to the legs 2 and supporting the lamp 4, used for lighting the burner 6.

5 is a reservoir containing the kerosene-oil, which supplies the burner 6 through the pipe 7, the connecting-union 8, and the stop-valve 9. This valve has on the neck of its shell a conical screw-thread *a*, on which the cap *b*, having a corresponding internal screw-thread, fits, and as it is screwed onto the thread *a* it forms a perfectly-tight joint without the use of packing (as usually required with valves having the projecting stem) by forcing the metal against the valve-stem. At the top of the reservoir 5 is a depressed portion serving as an opening and closed air-tight by a screw-stopper 10, used to fill the reservoir 5. At the bottom is a chamber 11, screwed air-tight to it, inside of which is a layer of cotton 12, placed between two perforated disks 13 13'. Its object is to prevent any motion of the oil in the burner 6 when the oil drops from the orifice 14 into the chamber 11. A tube 15 serves to put the chamber 11 in communication with the outside air.

In Fig. 2, 16 is a tube made in two parts, each part of which is made to fit into the upper and the lower end of the burner 6. The lower part is wide open for the purpose of admitting the air freely into the burner 6. The upper end is made to fit the perforated tube 17, which has also its lower end fitted on the burner 6.

18 is a perforated tube, its upper end covered by the air-chamber 21 and the lower end fitting on the burner 6.

19 is another perforated tube, its upper end covered with a disk having a central hole and the lower end fitting into the inside portion 6' of the burner 6.

20 is a central tube, its upper end made to fit the lower part of the air-chamber 21, passing through the disk of the perforated tube 19 and extending below the burner in order to supply the chamber 21 constantly with cool air.

21 is an air-chamber having at its circumference several rows of holes in order to deflect the air into the flame.

22 is a plate made to fit on a projecting part of the air-chamber 21 and serving to spread the flame.

6 is the burner or its principal part. It is made in two pieces. The central part 6' is made to fit into the other, and a shoulder keeps it in place and is secured by the nut 23.

24 is a circular space in which the oil is admitted and passes through the joint between the perforated tubes 18 19, where it is converted into vapor. The outer part has a ring 27 held to it by three braces for supporting the tube 16.

In Fig. 1, 25 is a valve placed under the union 8. Its object is to regulate or stop the flow of the oil into the burner 6.

In Fig. 2, 26 is a casing made to fit into the lower part of the burner 6. Its use is to prevent the radiation of heat from the burner.

In the operation of the burner 6, having removed the screw-stopper 10 of the reservoir 5, the tube 15 being shut with a cork to prevent the escape of air contained in the chamber 11, the oil is introduced into the reservoir 5. This operation finished, the screw-stopper 10 is again screwed tight in its place to prevent by this passage any admittance of air into the reservoir 5. By removing the cork which shuts the tube 15 the oil penetrates through the orifice 14 into the chamber 11 and rises up until it covers the orifice 14, which is on the same level with the space 24 of the burner 6. The orifice 14 being shut, no more air can enter into the reservoir 5, and the flow of oil into the chamber 11 is stopped by the action of atmospheric pressure until a portion of it is consumed at the burner 6. This uncovers the orifice 14, the air is again admitted into the reservoir 5, and a new quantity of oil is discharged into the chamber 11, and so on. The lamp 4 is placed under the burner, and when it is sufficiently warm the valves 25 and 9 are opened. The oil enters into the burner 6, which is warm enough to convert it into vapor, which passes through the perforated tubes and escapes outside below the cap 22, where it is ignited, (the lamp 4 having been previously removed.) The flame passes through the perforated tubes, descends to the oil, ignites it, and converts it into vapor, and will continue to do so as long as the supply of oil lasts.

What I claim is—

1. In a vapor-stove, the combination of the reservoir 5, placed on a level with the top plate of the stove, the air-tight chamber 11, secured to the bottom thereof and communicating therewith, the layer of cotton 12 therein, the perforated disks 13 13', placed, respectively, above and below the same, the stopper 10, the tube 15, communicating with the chamber 11 and with the outer air, the pipe 7, and the burner, all substantially as described, and for the purpose set forth.

2. In a vapor-stove, the burner 6, composed of the tube 16, the perforated tubes 17 18 19, the central tube 20, for carrying the air into the air-chamber 21, the air-chamber 21, having a projecting part to support the cap 22, the cap 22, for the purpose of deflecting the flame, the part 6, supporting the perforated tubes 17 18 19, the ring 27, for receiving the tube 16, the central part 6', forming with the part 6 the space 24, for the admission of the oil, the pipe 7, the union 8, the stop-valve 9, the casing 26, and the lamp 4, for the purpose of lighting the burner 6, all arranged and operating substantially as described, and for the purpose specified.

3. In a burner for vapor-stoves, the combination of the valve-casing 9, having its conical end $a$ threaded, and a conical cap $b$ fitting it, and the valve-stem screwed into the casing, which serves to regulate the escape of gas, as shown, and for the purpose specified.

ANTOINE GATEAU.

Witnesses:
E. J. WALSH,
HENRY MEISELBAR.